3,183,202
POLYMER TREATMENT
William Baird, Gwilym Thomas Jones, and Raymond Deverell-Smith, all of Manchester, England, assignors to Imperial Chemical Industries Limited, London, England, a corporation of Great Britain
No Drawing. Filed July 30, 1962, Ser. No. 213,151
Claims priority, application Great Britain, Aug. 25, 1961, 30,740/61
5 Claims. (Cl. 260—32.6)

This invention relates to the treatment of polyolefines to reduce their tendency to acquire charges of static electricity.

According to the present invention we provide a process for reducing the tendency of polyolefines to acquire charges of static electricity by incorporating into the polyolefine or else applying to the surface of the polyolefine 0.01% to 5% of an antistatic agent consisting of (1) an N-(hydroxyalkylated) fatty acid amide or (2) an alkylene oxide condensate of a fatty acid amide or (3) an alkylene oxide condensate of an N-(hydroxylalkylated) fatty acid amide or (4) a mixture of two or more compounds selected from the first three classes.

The fatty acid from which the antistatic agent is derived may contain from 6 to 22 carbon atoms, but it is preferably selected from those containing 10 to 18 carbon atoms. The preferred compounds are the N,N-di-($\beta$-hydroxyethyl)amides, especially N,N-di-($\beta$-hydroxyethyl)lauramide. The preferred polyolefines are isotactic polypropylene and linear polyethylenes, for example those made by the Phillips process and the Ziegler low-pressure polmerisation process. The compounds are also effective antistatic agents in low density polyethylenes made by the high pressure polymerisation process (e.g. as made by Imperial Chemical Industries Limited under the trademark "Alkathene").

The antistatic agents are used preferably by incorporating them into the molten polyolefine before shaping into articles such as fibres, films or mouldings. Surface treatment is also effective but the antistatic effect is less permanent.

The invention is illustrated but not limited by the following examples in which parts and percentages are by weight:

EXAMPLE 1

0.2–1 part of N,N-di($\beta$-hydroxyethyl)lauramide is dissolved in 25 parts of acetone and thoroughly mixed into 100 parts by weight of finely powdered isotactic polypropylene. The mixture is dried to remove the solvent by heating for 30 minutes at 80° C. in an air circulating oven. The treated powder is then extruded, e.g. at 250° C. to produce a filament, film or foil, or alternatively cut into small granules which are cooled and are subsequently shaped by a conventional moulding operation at 250° C. cooling under pressure to retain the required shape.

After allowing the treated polypropylene to condition for several hours it shows much less tendency to pick up dirt from the atmosphere than the untreated material, and on rubbing the surface it generates a much lower electrostatic charge, which dissipates much more rapidly. The static effect is shown by the results quoted in Table 1 below, obtained after conditioning polypropylene films for 48 hours at 62% relative humidity and 70° F. and determining the static effect by the method described by Hayek and Chromey (Am. Dyes Reptr. 40, 164, 1951).

Table 1

| Polypropylene Film | $\mu$a. | ½T |
|---|---|---|
| Untreated | >4,000 | >180 |
| Treated with 1% N,N-di($\beta$-hydroxyethyl)lauramide | 30 | 1 |
| Treated with 0.5% N,N-di($\beta$-hydroxyethyl)lauramide | 150 | 70 |
| Treated with 0.2% N,N-di($\beta$-hydroxyethyl)lauramide | 2,000 | 120 |

$\mu$a.=charge arbitrarily expressed in micro-amperes after 3 minutes' rubbing.
½T=time in seconds for charge to decay to half its value after rubbing.

EXAMPLE 2

If one part of the condensation product of one mole of N-($\beta$-hydroxyethyl)stearamide with 5.5 moles of ethylene oxide is used in the process described in Example 1 in place of N,N-di($\beta$-hydroxyethyl)lauramide, a similar reduction in static charge is obtained as is shown in Table 2.

Table 2

| Polypropylene Film | $\mu$a. | ½T |
|---|---|---|
| Untreated | >4,000 | >180 |
| Treated | 400 | 150 |

EXAMPLE 3

If one part of the condensation product of one mole of lauramide with 2 moles of ethylene oxide is used by the process described in Example 1, in place of 1 part of N,N-di($\beta$-hydroxyethyl)lauramide, a similar satisfactory reduction in static charge is obtained as is shown in Table 3.

Table 3

| Polypropylene Film | $\mu$a. | ½T |
|---|---|---|
| Untreated | >4,000 | >180 |
| Treated | 200 | 57 |

EXAMPLE 4

If 0.5 part of N,N-di($\beta$-hydroxyethyl)lauramide is used to treat 100 parts of linear polyethylene made by (a) the Phillips Process (e.g. that made by British Hydrocarbon Chemicals Limited under the trademark "Rigidex"), or (b) the Ziegler Process (e.g. that made by Shell Chemical Co. Limited under the trademark "Carlona") instead of polypropylene as described in Example 1, a similar beneficial reduction in static charge is obtained.

This is illustrated by the data in Table 4.

Table 4

| Polyethylene Film | $\mu$a. | ½T |
|---|---|---|
| Untreated Phillips Process polyethylene | 2,000 | >180 |
| Phillips Process polyethylene treated with 0.5% N,N-di($\beta$-hydroxyethyl)lauramide | 1,200 | 70 |
| Untreated Ziegler Process polyethylene | 2,960 | >180 |
| Ziegler Process polyethylene treated with 0.5% N,N-di($\beta$-hydroxyethyl)lauramide | 300 | 28 |

What we claim is:
1. A polyolefine selected from the group consisting of polyethylene and polypropylene having a reduced tendency to acquire charges of static electricity, said polyolefine including from 0.01% to 5% of an N,N-di-($\beta$-hydroxyethyl) fatty acid amide as an antistatic agent therefor, the fatty acid of said amide containing from 6 to 22 carbon atoms.

2. A polyolefine having a reduced tendency to acquire charges of static electricity, said polyolefine being selected from the group consisting of polyethylene and polypropylene and including from 0.1 to 5% of an N,N-di-($\beta$-hydroxyethyl) fatty acid amide as an anti-static agent, the fatty acid of said amide containing from 6 to 22 carbon atoms.

3. A polyolefine having a reduced tendency to acquire charges of static electricity, said polyolefine being selected from the group consisting of polyethylene and polypropylene and including from 0.1 to 5% of N,N-di-($\beta$-hydroxyethyl)lauramide as an anti-static agent.

4. A shaped structure comprising the polyolefine of claim 1, said structure being selected from the group consisting of films, filaments and mouldings.

5. A shaped polyolefine article having a reduced tendency to acquire charges of static electricity, said polyolefine being selected from the group consisting of polyethylene and polypropylene and including from about 0.01 to about 5% by weight of an N,N-di-($\beta$-hydroxyethyl) fatty acid amide as an antistatic agent therefor, the fatty acid of said amide containing from 6 to 22 carbon atoms, said article having much less tendency to pick up dirt from the atmosphere than the untreated polyolefine and being further characterized by having a charge of less than about 4000 micro amperes after 3 minutes rubbing with less than about 180 seconds required for a charge to decay to half its value after rubbing.

References Cited by the Examiner
UNITED STATES PATENTS

| | | | |
|---|---|---|---|
| 2,877,246 | 3/59 | Schurman | 260—404 |
| 2,956,979 | 10/60 | Rowland et al. | 260—32.6 |
| 2,991,265 | 7/61 | Clark et al. | 260—32.6 |
| 3,040,075 | 6/62 | Lohr | 260—404 |

MORRIS LIEBMAN, *Primary Examiner.*

ALEXANDER H. BRODMERKEL, *Examiner.*